(12) United States Patent
Crescenti et al.

(10) Patent No.: US 8,433,679 B2
(45) Date of Patent: *Apr. 30, 2013

(54) MODULAR SYSTEMS AND METHODS FOR MANAGING DATA STORAGE OPERATIONS

(75) Inventors: John Crescenti, Freehold, NJ (US); Srinivas Kavuri, Highland Park, NJ (US); David Alan Oshinsky, East Brunswick, NJ (US); Anand Prahlad, East Brunswick, NJ (US)

(73) Assignee: CommVault Systems, Inc., Oceanport, NJ (US)

( * ) Notice: Subject to any disclaimer, the term of this patent is extended or adjusted under 35 U.S.C. 154(b) by 785 days.

This patent is subject to a terminal disclaimer.

(21) Appl. No.: 12/135,584

(22) Filed: Jun. 9, 2008

(65) Prior Publication Data

US 2008/0244177 A1    Oct. 2, 2008

Related U.S. Application Data

(63) Continuation of application No. 09/354,063, filed on Jul. 15, 1999, now Pat. No. 7,389,311.

(51) Int. Cl.
*G06F 17/00* (2006.01)
(52) U.S. Cl.
USPC .......... 707/612; 707/694; 707/702; 707/823; 707/830
(58) Field of Classification Search .................. 707/612
See application file for complete search history.

(56) References Cited

U.S. PATENT DOCUMENTS

| 4,296,465 A | 10/1981 | Lemak |
| 4,686,620 A | 8/1987 | Ng |
| 4,995,035 A | 2/1991 | Cole et al. |
| 5,005,122 A | 4/1991 | Griffin et al. |
| 5,093,912 A | 3/1992 | Dong et al. |

(Continued)

FOREIGN PATENT DOCUMENTS

| EP | 0259912 | 3/1988 |
| EP | 0259912 A | 3/1988 |

(Continued)

OTHER PUBLICATIONS

Armstead et al., "Implementation of a Campus-wide Distributed Mass Storage Service: The Dream vs. Reality," *IEEE*, 1995, pp. 190-199.
Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.

(Continued)

*Primary Examiner* — Hosain Alam
*Assistant Examiner* — Bruce Witzenburg
(74) *Attorney, Agent, or Firm* — Knobbe Martens Olson & Bear LLP

(57) ABSTRACT

The invention is a modular backup and retrieval system. The software modules making up the backup and retrieval system run independently, and can run either on the same computing devices or on different computing devices. The modular software system coordinates and performs backups of various computing devices communicating to the modules. At least one module on one of the computing devices acts as a system manager for a network backup regimen. A management component acts as a manager for the archival and restoration of the computing devices on the network. It manages and allocates library media usage, maintains backup scheduling and levels, and supervises or maintains the archives themselves through pruning or aging policies. A second software module acts as a manager for each particular library media.

19 Claims, 12 Drawing Sheets

U.S. PATENT DOCUMENTS

| | | | |
|---|---|---|---|
| 5,133,065 A | 7/1992 | Cheffetz et al. | |
| 5,163,148 A * | 11/1992 | Walls | 711/162 |
| 5,193,154 A | 3/1993 | Kitajima et al. | |
| 5,212,772 A | 5/1993 | Masters | |
| 5,226,157 A | 7/1993 | Nakano et al. | |
| 5,239,647 A | 8/1993 | Anglin et al. | |
| 5,241,668 A | 8/1993 | Eastridge et al. | |
| 5,241,670 A | 8/1993 | Eastridge et al. | |
| 5,265,159 A | 11/1993 | Kung | |
| 5,276,860 A | 1/1994 | Fortier et al. | |
| 5,276,867 A | 1/1994 | Kenley et al. | |
| 5,287,500 A | 2/1994 | Stoppani, Jr. | |
| 5,301,351 A | 4/1994 | Jippo | |
| 5,311,509 A | 5/1994 | Heddes et al. | |
| 5,321,816 A | 6/1994 | Rogan et al. | |
| 5,333,251 A | 7/1994 | Urabe et al. | |
| 5,333,315 A | 7/1994 | Saether et al. | |
| 5,347,653 A | 9/1994 | Flynn et al. | |
| 5,410,700 A | 4/1995 | Fecteau et al. | |
| 5,426,284 A | 6/1995 | Doyle | |
| 5,448,724 A | 9/1995 | Hayashi et al. | |
| 5,455,926 A | 10/1995 | Keele et al. | |
| 5,491,810 A | 2/1996 | Allen | |
| 5,495,607 A | 2/1996 | Pisello et al. | |
| 5,504,873 A | 4/1996 | Martin et al. | |
| 5,544,345 A | 8/1996 | Carpenter et al. | |
| 5,544,347 A | 8/1996 | Yanai et al. | |
| 5,555,404 A | 9/1996 | Torbjornsen et al. | |
| 5,559,957 A | 9/1996 | Balk | |
| 5,559,991 A | 9/1996 | Kanfi | |
| 5,574,898 A | 11/1996 | Leblang et al. | |
| 5,598,546 A | 1/1997 | Blomgren | |
| 5,613,134 A | 3/1997 | Lucus et al. | |
| 5,615,392 A | 3/1997 | Harrison et al. | |
| 5,619,644 A | 4/1997 | Crockett et al. | |
| 5,638,509 A | 6/1997 | Dunphy et al. | |
| 5,642,496 A | 6/1997 | Kanfi | |
| 5,649,185 A | 7/1997 | Antognini et al. | |
| 5,659,614 A | 8/1997 | Bailey | |
| 5,673,381 A | 9/1997 | Huai et al. | |
| 5,675,511 A | 10/1997 | Prasad et al. | |
| 5,677,900 A | 10/1997 | Nishida et al. | |
| 5,682,513 A | 10/1997 | Candelaria et al. | |
| 5,687,343 A | 11/1997 | Fecteau et al. | |
| 5,699,361 A | 12/1997 | Ding et al. | |
| 5,719,786 A | 2/1998 | Nelson et al. | |
| 5,729,743 A | 3/1998 | Squibb | |
| 5,734,817 A | 3/1998 | Roffe et al. | |
| 5,737,747 A | 4/1998 | Vishlitsky et al. | |
| 5,740,405 A | 4/1998 | DeGraaf | |
| 5,742,807 A * | 4/1998 | Masinter | 707/610 |
| 5,751,997 A | 5/1998 | Kullick et al. | |
| 5,758,359 A | 5/1998 | Saxon | |
| 5,758,649 A | 6/1998 | Iwashita et al. | |
| 5,761,677 A | 6/1998 | Senator et al. | |
| 5,761,734 A | 6/1998 | Pfeffer et al. | |
| 5,764,972 A | 6/1998 | Crouse et al. | |
| 5,778,395 A | 7/1998 | Whiting et al. | |
| 5,790,828 A | 8/1998 | Jost | |
| 5,805,920 A | 9/1998 | Sprenkle et al. | |
| 5,806,058 A | 9/1998 | Mori et al. | |
| 5,812,398 A | 9/1998 | Nielsen | |
| 5,812,748 A | 9/1998 | Ohran et al. | |
| 5,813,009 A * | 9/1998 | Johnson et al. | 707/695 |
| 5,813,013 A | 9/1998 | Shakib et al. | |
| 5,813,017 A | 9/1998 | Morris | |
| 5,829,046 A | 10/1998 | Tzelnic et al. | |
| 5,835,953 A | 11/1998 | Ohran | |
| 5,845,257 A | 12/1998 | Fu et al. | |
| 5,860,073 A | 1/1999 | Ferrel et al. | |
| 5,860,104 A | 1/1999 | Witt et al. | |
| 5,864,871 A | 1/1999 | Kitain et al. | |
| 5,875,478 A | 2/1999 | Blumenau | |
| 5,875,481 A | 2/1999 | Ashton et al. | |
| 5,884,067 A | 3/1999 | Storm et al. | |
| 5,887,134 A | 3/1999 | Ebrahim | |
| 5,896,531 A | 4/1999 | Curtis et al. | |
| 5,897,642 A | 4/1999 | Capossela et al. | |
| 5,898,431 A | 4/1999 | Webster et al. | |
| 5,901,327 A | 5/1999 | Ofek | |
| 5,924,102 A | 7/1999 | Perks | |
| 5,926,836 A | 7/1999 | Blumenau | |
| 5,933,104 A | 8/1999 | Kimura | |
| 5,933,601 A | 8/1999 | Fanshier et al. | |
| 5,950,205 A | 9/1999 | Aviani, Jr. | |
| 5,956,519 A | 9/1999 | Wise et al. | |
| 5,956,733 A | 9/1999 | Nakano et al. | |
| 5,958,005 A | 9/1999 | Thorne et al. | |
| 5,970,233 A | 10/1999 | Liu et al. | |
| 5,970,255 A | 10/1999 | Tran et al. | |
| 5,974,563 A | 10/1999 | Beeler, Jr. | |
| 5,978,841 A | 11/1999 | Berger | |
| 5,987,478 A | 11/1999 | See et al. | |
| 5,991,753 A | 11/1999 | Wilde | |
| 5,995,091 A | 11/1999 | Near et al. | |
| 6,000,020 A | 12/1999 | Chin et al. | |
| 6,003,089 A | 12/1999 | Shaffer et al. | |
| 6,009,274 A | 12/1999 | Fletcher et al. | |
| 6,012,090 A | 1/2000 | Chung et al. | |
| 6,016,553 A | 1/2000 | Schneider et al. | |
| 6,018,744 A | 1/2000 | Mamiya et al. | |
| 6,021,415 A | 2/2000 | Cannon et al. | |
| 6,023,710 A | 2/2000 | Steiner et al. | |
| 6,026,414 A | 2/2000 | Anglin | |
| 6,026,437 A | 2/2000 | Muschett et al. | |
| 6,052,735 A | 4/2000 | Ulrich et al. | |
| 6,070,228 A | 5/2000 | Belknap et al. | |
| 6,073,137 A | 6/2000 | Brown et al. | |
| 6,073,220 A | 6/2000 | Gunderson | |
| 6,076,148 A | 6/2000 | Kedem et al. | |
| 6,078,934 A | 6/2000 | Lahey et al. | |
| 6,085,030 A * | 7/2000 | Whitehead et al. | 709/203 |
| 6,088,694 A | 7/2000 | Burns et al. | |
| 6,091,518 A | 7/2000 | Anabuki | |
| 6,094,416 A | 7/2000 | Ying | |
| 6,101,585 A * | 8/2000 | Brown et al. | 711/162 |
| 6,105,037 A | 8/2000 | Kishi | |
| 6,105,129 A | 8/2000 | Meier et al. | |
| 6,108,640 A | 8/2000 | Slotznick | |
| 6,108,712 A | 8/2000 | Hayes, Jr. | |
| 6,112,239 A | 8/2000 | Kenner et al. | |
| 6,122,668 A | 9/2000 | Teng et al. | |
| 6,131,095 A | 10/2000 | Low et al. | |
| 6,131,190 A | 10/2000 | Sidwell | |
| 6,137,864 A | 10/2000 | Yaker | |
| 6,148,377 A | 11/2000 | Carter et al. | |
| 6,148,412 A | 11/2000 | Cannon et al. | |
| 6,154,787 A | 11/2000 | Urevig et al. | |
| 6,154,852 A | 11/2000 | Amundson et al. | |
| 6,161,111 A | 12/2000 | Mutalik et al. | |
| 6,161,192 A * | 12/2000 | Lubbers et al. | 714/6 |
| 6,167,402 A | 12/2000 | Yeager | |
| 6,175,829 B1 | 1/2001 | Li et al. | |
| 6,189,051 B1 | 2/2001 | Oh et al. | |
| 6,212,512 B1 | 4/2001 | Barney et al. | |
| 6,212,521 B1 | 4/2001 | Minami et al. | |
| 6,230,164 B1 | 5/2001 | Rikieta et al. | |
| 6,249,795 B1 | 6/2001 | Douglis | |
| 6,253,217 B1 | 6/2001 | Dourish et al. | |
| 6,260,069 B1 | 7/2001 | Anglin | |
| 6,263,368 B1 * | 7/2001 | Martin | 709/224 |
| 6,269,382 B1 | 7/2001 | Cabrera et al. | |
| 6,269,431 B1 | 7/2001 | Dunham | |
| 6,275,953 B1 | 8/2001 | Vahalia et al. | |
| 6,292,783 B1 | 9/2001 | Rohler | |
| 6,295,541 B1 | 9/2001 | Bodnar et al. | |
| 6,301,592 B1 | 10/2001 | Aoyama et al. | |
| 6,304,880 B1 | 10/2001 | Kishi | |
| 6,314,439 B1 | 11/2001 | Bates et al. | |
| 6,314,460 B1 | 11/2001 | Knight et al. | |
| 6,324,581 B1 | 11/2001 | Xu et al. | |
| 6,328,766 B1 | 12/2001 | Long | |
| 6,330,570 B1 | 12/2001 | Crighton et al. | |
| 6,330,572 B1 | 12/2001 | Sitka | |
| 6,330,589 B1 | 12/2001 | Kennedy | |
| 6,330,642 B1 | 12/2001 | Carteau | |
| 6,343,287 B1 | 1/2002 | Kumar et al. | |

| | | |
|---|---|---|
| 6,343,324 B1 | 1/2002 | Hubis et al. |
| 6,351,764 B1 | 2/2002 | Voticky et al. |
| RE37,601 E | 3/2002 | Eastridge et al. |
| 6,353,878 B1 | 3/2002 | Dunham |
| 6,356,801 B1 | 3/2002 | Goodman et al. |
| 6,356,863 B1 | 3/2002 | Sayle |
| 6,360,306 B1 | 3/2002 | Bergsten |
| 6,367,029 B1 | 4/2002 | Mayhead et al. |
| 6,374,336 B1 | 4/2002 | Peters et al. |
| 6,389,432 B1 | 5/2002 | Pothapragada et al. |
| 6,396,513 B1 | 5/2002 | Helfman et al. |
| 6,397,308 B1 | 5/2002 | Ofek et al. |
| 6,418,478 B1 | 7/2002 | Ignatius et al. |
| 6,421,709 B1 | 7/2002 | McCormick et al. |
| 6,421,711 B1 | 7/2002 | Blumenau et al. |
| 6,438,595 B1 | 8/2002 | Blumenau et al. |
| 6,453,325 B1 | 9/2002 | Cabrera et al. |
| 6,466,592 B1 | 10/2002 | Chapman |
| 6,470,332 B1 | 10/2002 | Weschler |
| 6,473,794 B1 | 10/2002 | Guheen et al. |
| 6,487,561 B1 | 11/2002 | Ofek et al. |
| 6,487,644 B1 | 11/2002 | Huebsch et al. |
| 6,493,811 B1 | 12/2002 | Blades et al. |
| 6,519,679 B2 | 2/2003 | Devireddy et al. |
| 6,535,910 B1 | 3/2003 | Suzuki et al. |
| 6,538,669 B1 | 3/2003 | Lagueux, Jr. et al. |
| 6,542,909 B1 | 4/2003 | Tamer et al. |
| 6,542,972 B2 | 4/2003 | Ignatius et al. |
| 6,546,545 B1 | 4/2003 | Honarvar et al. |
| 6,549,918 B1 | 4/2003 | Probert et al. |
| 6,553,410 B2 | 4/2003 | Kikinis |
| 6,557,039 B1 | 4/2003 | Leong et al. |
| 6,564,219 B1 | 5/2003 | Lee et al. |
| 6,564,228 B1 | 5/2003 | O'Connor |
| 6,581,143 B2 | 6/2003 | Gagne et al. |
| 6,593,656 B2 | 7/2003 | Ahn et al. |
| 6,604,149 B1 | 8/2003 | Deo et al. |
| 6,615,241 B1 | 9/2003 | Miller et al. |
| 6,631,493 B2 | 10/2003 | Ottesen et al. |
| 6,647,396 B2 | 11/2003 | Parnell et al. |
| 6,647,409 B1 | 11/2003 | Sherman et al. |
| 6,654,825 B2 | 11/2003 | Clapp et al. |
| 6,658,436 B2 | 12/2003 | Oshinsky et al. |
| 6,658,526 B2 | 12/2003 | Nguyen et al. |
| 6,704,933 B1 | 3/2004 | Tanaka et al. |
| 6,721,767 B2 | 4/2004 | De Meno et al. |
| 6,728,733 B2 | 4/2004 | Tokui |
| 6,732,124 B1 | 5/2004 | Koseki et al. |
| 6,742,092 B1 | 5/2004 | Huebsch et al. |
| 6,757,794 B2 | 6/2004 | Cabrera et al. |
| 6,760,723 B2 | 7/2004 | Oshinsky et al. |
| 6,763,351 B1 | 7/2004 | Subramaniam et al. |
| 6,789,161 B1 | 9/2004 | Blendermann et al. |
| 6,871,163 B2 | 3/2005 | Hiller et al. |
| 6,874,023 B1 | 3/2005 | Pennell et al. |
| 6,886,020 B1 | 4/2005 | Zahavi et al. |
| 6,941,304 B2 | 9/2005 | Gainey et al. |
| 6,952,758 B2 | 10/2005 | Chron et al. |
| 6,968,351 B2 | 11/2005 | Butterworth |
| 6,973,553 B1 | 12/2005 | Archibald, Jr. et al. |
| 6,978,265 B2 | 12/2005 | Schumacher |
| 6,983,351 B2 | 1/2006 | Gibble et al. |
| 7,003,519 B1 | 2/2006 | Biettron et al. |
| 7,003,641 B2 | 2/2006 | Prahlad et al. |
| 7,035,880 B1 | 4/2006 | Crescenti et al. |
| 7,039,860 B1 | 5/2006 | Gautestad |
| 7,062,761 B2 | 6/2006 | Slavin et al. |
| 7,076,685 B2 | 7/2006 | Pillai et al. |
| 7,082,441 B1 | 7/2006 | Zahavi et al. |
| 7,085,904 B2 | 8/2006 | Mizuno et al. |
| 7,096,315 B2 | 8/2006 | Takeda et al. |
| 7,103,731 B2 | 9/2006 | Gibble et al. |
| 7,103,740 B1 | 9/2006 | Colgrove et al. |
| 7,107,298 B2 | 9/2006 | Prahlad et al. |
| 7,107,395 B1 | 9/2006 | Ofek et al. |
| 7,120,757 B2 | 10/2006 | Tsuge |
| 7,130,970 B2 | 10/2006 | Devassy et al. |
| 7,149,893 B1 | 12/2006 | Leonard et al. |
| 7,155,465 B2 | 12/2006 | Lee et al. |
| 7,155,481 B2 | 12/2006 | Prahlad et al. |
| 7,155,633 B2 | 12/2006 | Tuma et al. |
| 7,174,312 B2 | 2/2007 | Harper et al. |
| 7,194,454 B2 | 3/2007 | Hansen et al. |
| 7,246,140 B2 | 7/2007 | Therrien et al. |
| 7,246,207 B2 | 7/2007 | Kottomtharayil et al. |
| 7,269,612 B2 | 9/2007 | Devarakonda et al. |
| 7,278,142 B2 | 10/2007 | Bandhole et al. |
| 7,287,047 B2 | 10/2007 | Kavuri |
| 7,293,133 B1 | 11/2007 | Colgrove et al. |
| 7,315,923 B2 | 1/2008 | Retnamma et al. |
| 7,315,924 B2 | 1/2008 | Prahlad et al. |
| 7,328,225 B1 | 2/2008 | Beloussov et al. |
| 7,343,356 B2 | 3/2008 | Prahlad et al. |
| 7,343,365 B2 | 3/2008 | Farnham et al. |
| 7,343,453 B2 | 3/2008 | Prahlad et al. |
| 7,343,459 B2 | 3/2008 | Prahlad et al. |
| 7,346,623 B2 | 3/2008 | Prahlad et al. |
| 7,346,751 B2 | 3/2008 | Prahlad et al. |
| 7,356,657 B2 | 4/2008 | Mikami |
| 7,359,917 B2 | 4/2008 | Winter et al. |
| 7,380,072 B2 | 5/2008 | Kottomtharayil et al. |
| 7,389,311 B1 | 6/2008 | Crescenti et al. |
| 7,395,282 B1 | 7/2008 | Crescenti et al. |
| 7,409,509 B2 | 8/2008 | Devassy et al. |
| 7,430,587 B2 | 9/2008 | Malone et al. |
| 7,433,301 B2 | 10/2008 | Akahane et al. |
| 7,434,219 B2 | 10/2008 | De Meno et al. |
| 7,447,692 B2 | 11/2008 | Oshinsky et al. |
| 7,467,167 B2 | 12/2008 | Patterson |
| 7,472,238 B1 | 12/2008 | Gokhale |
| 7,484,054 B2 | 1/2009 | Kottomtharayil et al. |
| 7,490,207 B2 | 2/2009 | Amarendran |
| 7,496,589 B1 | 2/2009 | Jain et al. |
| 7,500,053 B1 | 3/2009 | Kavuri et al. |
| 7,500,150 B2 | 3/2009 | Sharma et al. |
| 7,509,316 B2 | 3/2009 | Greenblatt et al. |
| 7,512,601 B2 | 3/2009 | Cucerzan et al. |
| 7,519,726 B2 | 4/2009 | Palliyil et al. |
| 7,523,483 B2 | 4/2009 | Dogan |
| 7,529,748 B2 | 5/2009 | Wen et al. |
| 7,532,340 B2 | 5/2009 | Koppich et al. |
| 7,536,291 B1 | 5/2009 | Retnamma et al. |
| 7,543,125 B2 | 6/2009 | Gokhale |
| 7,546,324 B2 | 6/2009 | Prahlad et al. |
| 7,596,586 B2 | 9/2009 | Gokhale et al. |
| 7,613,748 B2 | 11/2009 | Brockway et al. |
| 7,617,253 B2 | 11/2009 | Prahlad et al. |
| 7,617,262 B2 | 11/2009 | Prahlad et al. |
| 7,617,541 B2 | 11/2009 | Plotkin et al. |
| 7,627,598 B1 | 12/2009 | Burke |
| 7,627,617 B2 | 12/2009 | Kavuri et al. |
| 7,636,743 B2 | 12/2009 | Erofeev |
| 7,651,593 B2 | 1/2010 | Prahlad et al. |
| 7,661,028 B2 | 2/2010 | Erofeev |
| 7,668,798 B2 | 2/2010 | Scanlon et al. |
| 7,685,126 B2 | 3/2010 | Patel et al. |
| 7,716,171 B2 | 5/2010 | Kryger |
| 7,734,715 B2 | 6/2010 | Hyakutake et al. |
| 7,757,043 B2 | 7/2010 | Kavuri et al. |
| 7,840,537 B2 | 11/2010 | Gokhale et al. |
| 7,844,676 B2 | 11/2010 | Prahlad et al. |
| 7,873,808 B2 | 1/2011 | Stewart |
| 8,041,673 B2 | 10/2011 | Crescenti et al. |
| 8,078,583 B2 | 12/2011 | Prahlad et al. |
| 8,103,670 B2 | 1/2012 | Oshinsky et al. |
| 2002/0004883 A1 | 1/2002 | Nguyen et al. |
| 2002/0040376 A1 | 4/2002 | Yamanaka et al. |
| 2002/0042869 A1 | 4/2002 | Tate et al. |
| 2002/0049626 A1 | 4/2002 | Mathias et al. |
| 2002/0049778 A1 | 4/2002 | Bell et al. |
| 2002/0069324 A1 | 6/2002 | Gerasimov et al. |
| 2002/0103848 A1 | 8/2002 | Giacomini et al. |
| 2002/0107877 A1 | 8/2002 | Whiting et al. |
| 2002/0161753 A1 | 10/2002 | Inaba et al. |
| 2003/0061491 A1 | 3/2003 | Jaskiewicz et al. |
| 2003/0097361 A1 | 5/2003 | Huang et al. |
| 2003/0172158 A1 | 9/2003 | Pillai et al. |
| 2004/0107199 A1 | 6/2004 | Dalrymple et al. |

| | | | |
|---|---|---|---|
| 2004/0193953 | A1 | 9/2004 | Callahan et al. |
| 2004/0205206 | A1 | 10/2004 | Naik et al. |
| 2005/0033800 | A1 | 2/2005 | Kavuri et al. |
| 2005/0114406 | A1 | 5/2005 | Borthakur et al. |
| 2005/0268068 | A1 | 12/2005 | Ignatius et al. |
| 2006/0005048 | A1 | 1/2006 | Osaki et al. |
| 2006/0010154 | A1 | 1/2006 | Prahlad et al. |
| 2006/0010227 | A1 | 1/2006 | Atluri |
| 2007/0043956 | A1 | 2/2007 | El Far et al. |
| 2007/0078913 | A1 | 4/2007 | Crescenti et al. |
| 2007/0100867 | A1 | 5/2007 | Celik et al. |
| 2007/0143756 | A1 | 6/2007 | Gokhale |
| 2007/0183224 | A1 | 8/2007 | Erofeev |
| 2007/0288536 | A1 | 12/2007 | Sen et al. |
| 2008/0059515 | A1 | 3/2008 | Fulton |
| 2008/0229037 | A1 | 9/2008 | Bunte et al. |
| 2008/0243914 | A1 | 10/2008 | Prahlad et al. |
| 2008/0243957 | A1 | 10/2008 | Prahlad et al. |
| 2008/0243958 | A1 | 10/2008 | Prahlad et al. |
| 2009/0055407 | A1 | 2/2009 | Oshinsky et al. |
| 2009/0228894 | A1 | 9/2009 | Gokhale |
| 2009/0248762 | A1 | 10/2009 | Prahlad et al. |
| 2009/0319534 | A1 | 12/2009 | Gokhale |
| 2009/0319585 | A1 | 12/2009 | Gokhale |
| 2010/0005259 | A1 | 1/2010 | Prahlad |
| 2010/0049753 | A1 | 2/2010 | Prahlad et al. |
| 2010/0094808 | A1 | 4/2010 | Erofeev |
| 2010/0100529 | A1 | 4/2010 | Erofeev |
| 2010/0122053 | A1 | 5/2010 | Prahlad et al. |
| 2010/0131461 | A1 | 5/2010 | Prahlad et al. |
| 2010/0138393 | A1 | 6/2010 | Crescenti et al. |
| 2010/0145909 | A1 | 6/2010 | Ngo |
| 2010/0179941 | A1 | 7/2010 | Agrawal et al. |
| 2010/0205150 | A1 | 8/2010 | Prahlad et al. |
| 2011/0066817 | A1 | 3/2011 | Kavuri et al. |
| 2011/0072097 | A1 | 3/2011 | Prahlad et al. |

FOREIGN PATENT DOCUMENTS

| | | |
|---|---|---|
| EP | 0341230 | 11/1989 |
| EP | 0381651 | 8/1990 |
| EP | 0405926 | 1/1991 |
| EP | 0467546 | 1/1992 |
| EP | 0467546 A | 1/1992 |
| EP | 0 599 466 B1 | 6/1994 |
| EP | 0670543 | 9/1995 |
| EP | 0717346 | 6/1996 |
| EP | 0774715 | 5/1997 |
| EP | 0774715 A | 5/1997 |
| EP | 0809184 | 11/1997 |
| EP | 0862304 | 9/1998 |
| EP | 0899662 | 3/1999 |
| EP | 0981090 | 2/2000 |
| EP | 0 986 011 A2 | 3/2000 |
| EP | 1174795 | 1/2002 |
| JP | H11-102314 | 4/1999 |
| JP | H11-259459 | 9/1999 |
| JP | 2001-60175 | 3/2001 |
| WO | WO 94/17474 | 8/1994 |
| WO | WO-95/13580 | 5/1995 |
| WO | WO 98/39707 | 9/1998 |
| WO | WO-99/12098 | 3/1999 |
| WO | WO 99/14692 | 3/1999 |
| WO | WO 99/23585 | 5/1999 |
| WO | WO 01/04756 | 1/2001 |
| WO | WO 2005/050381 | 6/2005 |

OTHER PUBLICATIONS

Cabrera et al., "ADSM: A Multi-Platform, Scalable, Backup and Archive Mass Storage System," Digest of Papers, Compcon '95, Proceedings of the 40th IEEE Computer Society International Conference, Mar. 1995, pp. 420-427, San Francisco, CA.

Eitel, "Backup and Storage Management in Distributed Heterogeneous Environments," *IEEE*, 1994, pp. 124-126.

Jander, M., "Launching Storage-Area Net," *Data Communications*, US, McGraw Hill, NY, vol. 27, No. 4 (Mar. 21, 1998), pp. 64-72.

Jason Gait, "The Optical File Cabinet: A Random-Access File System for Write-Once Optical Disks," *IEEE Computer*, vol. 21, No. 6, pp. 11-22 (1988).

Rosenblum et al., "The Design and Implementation of a Log-Structured File System," *Operating Systems Review SIGOPS*, vol. 25, No. 5, New York, US, pp. 1-15 (May 1991).

Arneson, David A., Control Data Corporation, *Development of Omniserver*; Mass Storage Systems, 1990, pp. 88-93.

U.S. Appl. No. 13/011,219, filed Jan. 21, 2011, Crescenti, John et al.

(Japanese) Office Action (translated), Application No. 2003/502696, dated Jul. 15, 2008.

(Japanese) Office Action (translated), Application No. 2003-504235, dated Mar. 25, 2008.

Ashton, et al., "Two Decades of policy-based storage management for the IBM mainframe computer", www.research.ibm.com, 19 pages, published Apr. 10, 2003, printed Jan. 3, 2009., www.research.ibm.com, Apr. 10, 2003, pp. 19.

Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Catapult, Inc., Microsoft Outlook 2000 Step by Step, Published May 7, 1999, "Collaborating with Others Using Outlook & Exchange", p. 8 including "Message Timeline."

http://en.wikipedia.org/wiki/Naive_Bayes_classifier.

International Search Report, PCT/US2000/019329, dated 21/12/200.

Jander, "Launching Storage-Area Net," Data Communications, US, McGraw Hill, NY, vol. 27, No. 4(Mar. 21, 1998), pp. 64-72.

Microsoft, about using Microsoft Excel 2000 files with earlier version Excel, 1985-1999, Microsoft, p. 1.

Toyoda, Fundamentals of Oracle 8i Backup and Recovery, DB Magazine, Japan, Shoeisha, Co., Ltd.; Jul. 2000; vol. 10, No. 4, 34 total pages.

Weatherspoon H. et al., "Silverback: A Global-Scale Archival System," Mar. 2001, pp. 1-15.

European Office Action, Application No. EP 019068337, dated Mar. 26, 2008.

International Search Report, PCT/US2000/019329, dated Dec. 21, 2000.

Japanese Office Action, Application No. 2003/502696, dated Jul. 15, 2008.

Translation of Japanese Office Action, Application No. 2003-504235, dated Mar. 25, 2008.

European Office Action dated Apr. 22, 2008, EP02778952.8.

International Preliminary Report on Patentability dated May 15, 2006, PCT/US2004/038278 filed Nov. 15, 2004, (Publication No. WO2005/050381).

International Search Report and Preliminary Report on Patentability dated Mar. 3, 2003, PCT/US2002/018169.

* cited by examiner

MODULAR SYSTEMS AND METHODS FOR MANAGING DATA STORAGE OPERATIONS

RELATED APPLICATION

The present application is a continuation of U.S. patent application Ser. No. 09/354,063, filed Jul. 15, 1999, which is hereby incorporated herein by reference in its entirety.

BACKGROUND OF THE INVENTION

1. Field of the Invention

The present invention is directed to storage and retrieval systems. In particular, the invention is directed towards a modular storage and retrieval system for a computer or a series of interconnected computers.

2. Description of the Related Art

Conventional backup devices usually employ a monolithic backup and retrieval system servicing a single server with attached storage devices. These systems usually control all aspects of data backup or retrieval, including timing the backup, directing the files to be backed up, directing the mode of the archival request, and directing the storage process itself through an attached storage device or devices. Further, these backup and retrieval systems are not scalable and often direct only one type of backup and retrieval system, whether it is a network backup or a single machine backup.

Due to the monolithic structure of these backup and retrieval systems, a slight change in the operation of any one of several functional aspects of the backup and retrieval system requires an expenditure of a large amount of effort. The effort would include upgrading and changing the backup and retrieval system, perhaps even up to reinstalling the backup and retrieval system in its entirety.

In addition, the operation of a backup and retrieval system across a network containing several different types of hardware and operating systems present many challenges to an enterprise scale backup. These problems include data coherency, bridging file system protocols, and accessibility issues across multiple hardware and operating system configurations.

Other solutions do not address scalability issues, hierarchy issues, and the problems inherent in the storage of different files in a network file system. Many other problems and disadvantages of the prior art will become apparent to one skilled in the art after comparing such prior art with the present invention as described herein.

SUMMARY OF THE INVENTION

The invention is directed towards a backup and retrieval system. The backup system comprises a first software agent for managing the overall backup and retrieval functions across one or more computers. The system comprises a second software agent in communication with the first software agent, where the second software agent is communicatively coupled to at least one library media. The second software agent controls and manages the physical backup of data onto the library media.

Another embodiment of the backup and retrieval system uses a third software agent. The third software agent manages the archival parameters of a single computing device. The third software agent is in communication with both the first and second software agents.

The first, second, and third components may reside on a single computing device, may be split among several computing devices, and may reside in any combination on a single computing device. Exemplary embodiments of the backup system may take the form where the first software agent and the second software agent operate on the same computing device, where the first and third software agents operate on the same computing device, there the first, second, or third software agents operate on the same computing device, where the second and third agents operate on the same computing device, where the three software agents all operate on different computing devices, or any combination involving the three software agents operating or not operating on common computing devices.

In one embodiment, the first software agent manages archival functions for a plurality of computing devices in communication with it. Thus, the first software agent acts as an enterprise wide backup and retrieval manager for the computing devices it is in contact with.

The backup and retrieval system may also take the form where the second software agent creates an index of information on the location of archived data during the course of creating an archive on the library media. Thus, the location of the archived data is preserved, and the second software agent communicates at least part of the indexed information to the first software agent. Also, the library media can comprise a plurality of different types of archival media.

In one embodiments, the first software agent can take the form of a management component. Similarly, the second software agent can take the form of a media component, and the third software agent can take the form of a client component.

DETAILED DESCRIPTION OF THE PREFERRED EMBODIMENTS

Figure 1:
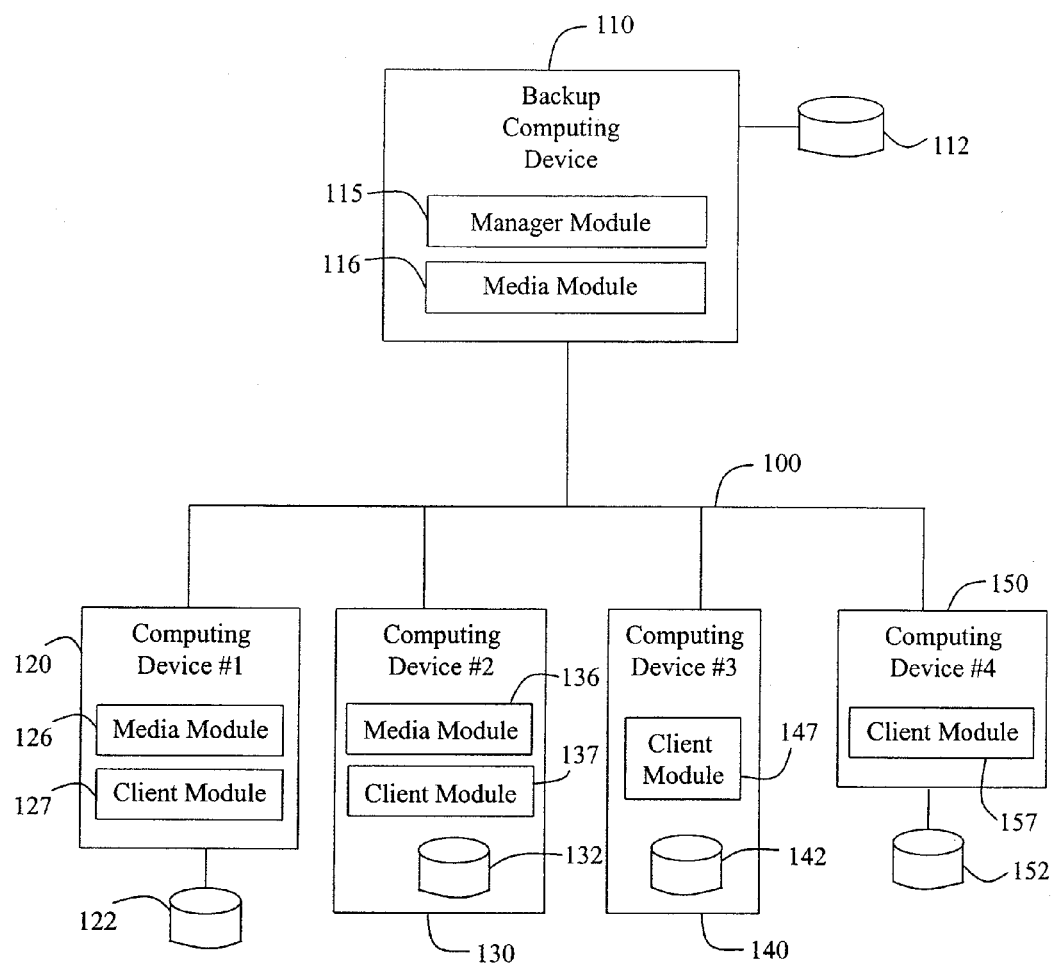
FIG. 1 is a schematic block diagram of a modular network backup system according to the invention.

FIG. 1 is a schematic block diagram of a network backup system according to the invention. The computer network 100 contains a number of attached computing devices 110, 120, 130, 140, and 150. Each of these network devices 110, 120, 130, 140, and 150 contain files and/or data that need to be archived. The network device 110 has an attached storage device 112, and the network devices 120 and 150 have attached library media 122 and 152, respectively. The network devices 130 and 140 have internally operated library devices 132 and 142, respectively. Data and/or files may be written to each of the storage device 112, 122, 132, 142, and 152.

In the present invention, the functions of the archival process are split among several software components or agents. The independent software agents focus specifically on one task of the archival process, and may be cohesively operated in a network environment across several machines.

For example, the network device 110 operates a manager module or software agent 115. The manager module coordinates the usage of the library media 112, 122, 132, 142, and 152 between usage of the network devices and backups.

The manager module 115 may also keep and dynamically maintain schedule or policies pertaining to the backup process across the network 100, or other sets of administrative duties, such as maintaining and enforcing pruning policies, aging policies, or the like. The manager module 115 could keep track of scheduling backups of the network devices 110, 120, 130, 140, and 150, keep track of the archival levels of each backup for each network device, keep track of the various applications running on the network devices and their need for backup. The manager module would also set the proper library media to which to direct the backup material.

The manager module 115 may also dynamically keep track of the parameters for the backup process, and may alter the scheduling or the level of backup dynamically based on the particular network device's or the backup device's limitations. The manager module 115 may also dynamically alter the backup scheduling or other administrative aspects of a particular backup based on the condition of the network 100 and its usage.

The network devices 110, 120, 130, and 150 contain media modules 116, 126, and 136, respectively. The media modules communicate with the manager module 115, and coordinate backups to the respective library media. Each media module is responsible for the archival functions of a logical library media. As such, the particular media module would coordinate the actions of the storage device which it is responsible for with the manager module.

For example, if the manager module 115 determined that network device 130 is ready for a backup, the media module would initiate a backup to a single storage device, or media library or libraries. The manager module 115 could determine that the backup of the network device 130 should be directed to the library media 122. The backup data from the network device 120 would be directed to the media module 126 on the network device 120 via a network 100, where the media module 126 would direct the physical backup of the data from the network device 120 onto the library media 122.

It should be noted that the manager module 115 could direct the backup of the network devices 120, 130, 140, or 150 through contacting and directing the client modules 127, 137, 147, or 157. The files and/or data units to be backed up from any of the network devices 120, 130, 140, or 150 may be directed to any of the backup devices 112, 122, or 132 through the use of the media modules 116, 126, or 136.

During the backup process, the media module responsible for the physical backing up of the file and/or data unit could then index the data as the information is being archived. This allows quick retrieval of any portion of data. Portions of the index data are then communicated to the manager module 115 to enable the manager module to quickly and easily locate and determine the status of backup files and/or data units for management purposes. The management module receives aggregate information concerning data bundles, tape offsets and physical volumes where the data is stored on the backed up files and/or data units. Thus, most of the information in the index regarding the backed up files and/or data units is kept local to the specific media manager that is responsible for the backup of the particular file and or data unit. This saves network and communication overhead, and localizes and decentralizes the internals of the indices to the locus of storage.

As such, this alleviates bottlenecks as the manager module 115 when large numbers of clients are browsing or restoring data. By distributing the indexing data around the network at the specific media modules, the manager module 115 acts like a directory service identifying which media module a specific client request should be serviced by. Thus, the load to provide browse/restore information is spread across many media modules.

Another software module or agent may be a client module. A client module could be responsible for the machine level, backup parameters. The client module 137 running on the network device 130 could be responsible for the backup parameters for the network device 130. These parameters may include requesting a change in scheduling, setting the priorities of the files and/or data to be archived in the case where the services are to be rationed or split across different types of library media.

The manager module 115, after determining that the network device 130 is in need of a backup, could communicate with the client module 137 to initiate the backup. The manager module 115 could indicate the specific media module or modules to which the client component should send the data and/or files to be backed up. The client component 137 could then initiate a direct communication with the specific media module or modules for transmissions of the backup. For example, if the manager module determines that the library media 122 is to be used in the particular backup of the network device 130, the manager module would indicate to the client module 137 that the media module 126 will be responsible for the backup.

In response, the client module 137 will direct the data and/or files directly to the media module 126. There, the medial module 126 would direct the actual archive of the data on the backup device the media module 126 is responsible for. It should be noted that the other client modules 127, 147, and 157 could be similarly directed. Thus, data and/or files on many different network devices may archive data to many different library media.

It should be understood that the modules indicated in FIG. 1 may be subdivided into further functional units. Thus, the single manager module, media module, and client module may actually comprise several interconnected functional modules.

Figure 2:
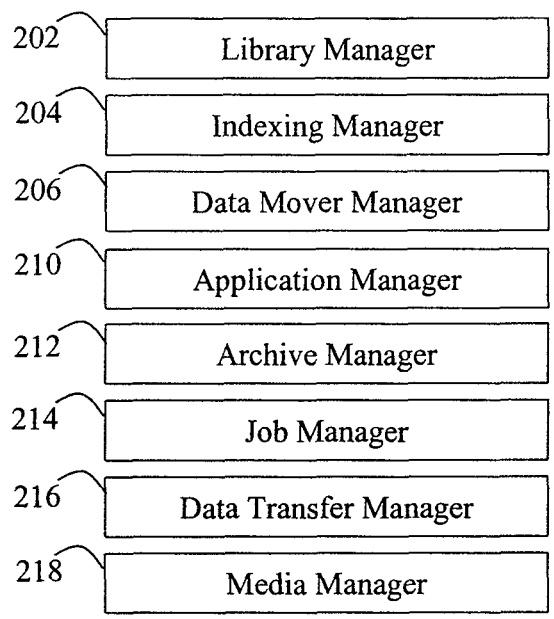
FIG. 2 is a logical block diagram of the various functional aspects that the software agents of FIG. 1 can take.

FIG. 2 is a logical block diagram of the various functional aspects that the software agents of FIG. 1 can take. The modules of FIG. 1 can comprise the library sub-agent 202, an indexing sub-agent 204, and a media data mover sub-agent 206. Typically, these modules would be associated with the network device controlling the library medium.

The indexing sub-agent 204 interfaces with an attached library media, and records the address on the library media where the particular information may be accessed. Thus, when the particular library media stores a file and/or data at a particular location, the location on the library media is reported to the indexing sub-agent 204 where the location is recorded. Through this indexing, a media module may report to a controlling manager module the physical location of the recorded file and/or data.

The media data mover sub-agent 206 manages the actual physical transfer of the file and/or data to and from the physical library medium. Media data mover sub-agent 206 also manages the transfer of the file and/or data to the requesting management module or client module. Thus, the transfer of the data can be divorced from the indexing function of the media module. In fact, different functional agents may be employed for these tasks.

The library sub-agent 202 is responsible for controlling the physical library media. Typically, the library sub-agent 202 presents a single interface to the rest of the backup system. Layered underneath the library sub component are device drivers for controlling any particular library medium, or the interface to a jukebox control system. As such, a library medium may be interchanged seamlessly with the rest of the backup system, including other sub-agents associated with the media manipulation.

Additional sub-modules or sub-agents can include an application sub-agent 210, an archive sub-agent 212, a job sub-agent 214, a media sub-agent 218, and a data transfer sub-agent 216. The functionality of the sub-agents 210, 212, 214, 216, and 218 include the functionality associated with management module, or the overall management of the modular backup system.

The application sub-agent 210 stores configuration parameters and current states for each application. The application sub-agent 210 could store the backup preference time information for all pertinent backup levels. The application sub-agent 210 could also be adaptive in nature. For example, the application sub-agent could determine new start times based on a last successful backup at each level.

The archive sub-agent 212 tracks the location of all archived files, archived file copies existing on other media, and portions of the archived files and the archived file copies as they exist across library media. The archive sub-agent 212 also tracks related archived files grouped together in an archive group.

The job sub-agent 214 tracks all jobs. The jobs may be currently running, waiting for resource, pending later, or failed. The job sub-agent 214 is responsible for restarting failed jobs, starting jobs when a drive becomes available, reporting upon all running, pending, and waiting jobs, killing jobs, and preempting jobs which are preemptable based on priorities.

The media sub-agent 218 keeps track of all sets of related media, and indirectly controls the library media via a library sub-agent associated with a media module. The media sub-agent 218 and the job sub-agent 214 act together to track library media utilization. The media sub-agent 218 knows how many drives are in use or available through each media module. Sine the job sub-agent 214 knows which jobs are using which drives available through a particular media module, the media sub-agent 218 and the job sub-agent 214 can coordinate to keep track of all the jobs and all the media used by those jobs.

The data transfer sub-agent 216 can independently coordinate the transfer of data to other components. The data transfer sub-agent can receive a block of data, a file, or both, and transfer the information to a particular client module or media module while the other sub-agent associated with the functions of the manager module operate. Thus the data transfer sub-agent 216 can serve as a queue or buffer in transferring data out of the manager module with which it is associated and free system resources for the operation of other sub-agents associated with the manager module functionality or other modules or sub-agents running on the same computing device.

Client sub-agents are designed for specific application environments and understand the semantics of those environments in order to determine backup units and candidates for backup based on specific criteria. These criteria can be modification time, specific types of files and/or data units created by an application, and other such criteria. The client sub-agents also understand how to reconstruct valid and consistent environments upon restore.

It should be noted that the sub-agents could exist as integrated modules in another agent, or operate in an independent manner. However, the sub-agents or modules existing under an agent provide functionality in a modular fashion in either case.

Figure 3:
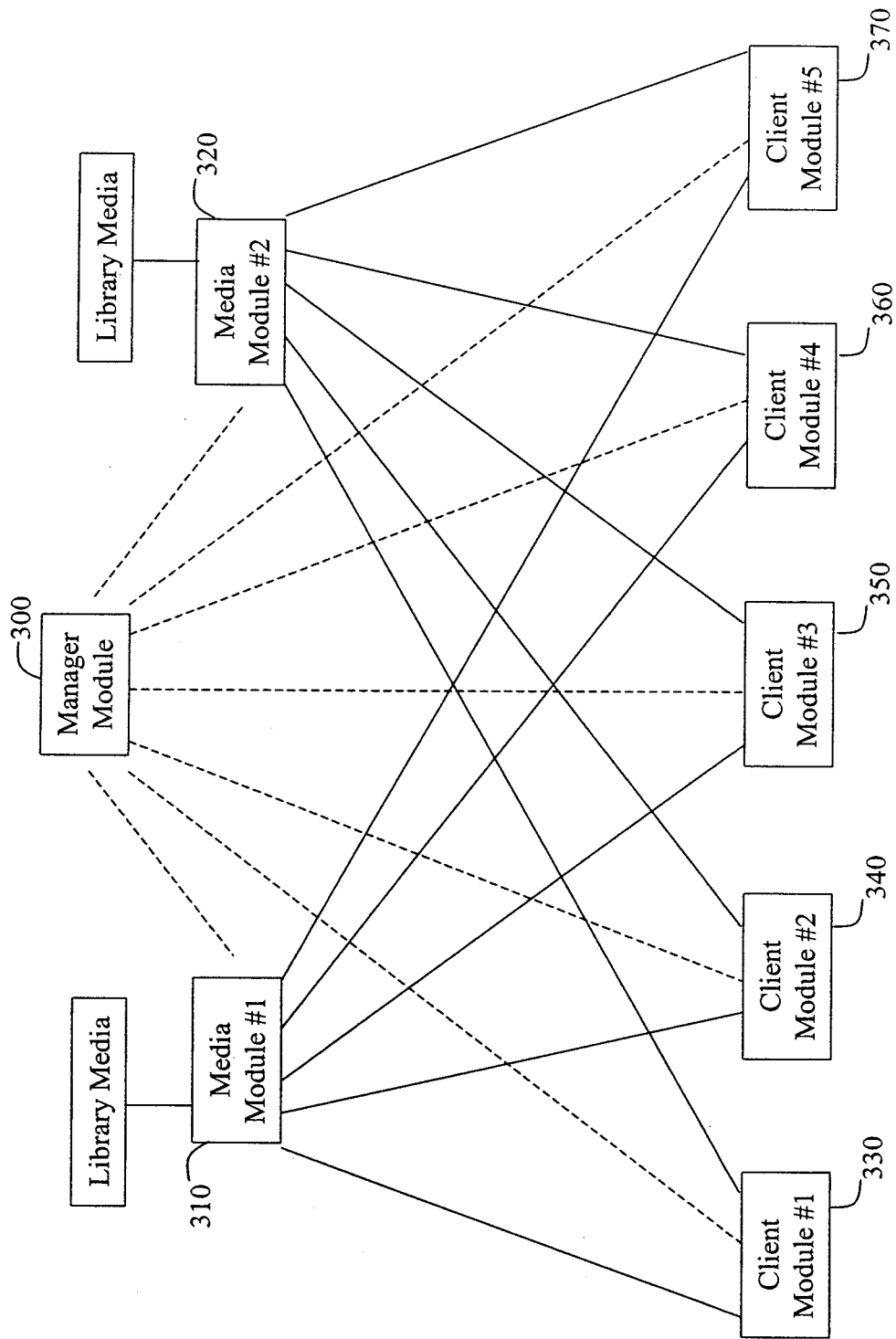
FIG. 3 is a logical block diagram of the various possible interconnections between the modular portions of the backup system of FIG. 1.

FIG. 3 is a logical block diagram of the various possible interconnections between the module portions of the backup system of FIG. 1. A manager module 300 communicates with the various other modules in a backup system. Client modules 330, 340, 350, 360, and 370 are responsible for the backup and archival processes for a particular computing device. The manager module 300 is communicatively coupled with each of the respective client modules 330, 340, 350, 360, and 370 in order to direct a cohesive system-wide backup policy involving the backup of each individual computing device that the particular client modules are responsible for.

Media modules 310 and 320 are also communicatively coupled to both the manager module 300 and the client modules 330, 340, 350, 360, and 370. In this manner the manager module 300 may oversee and direct the interactions of the client modules with the media modules. It may also formulate and keep track of the usage of the media modules and help maintain a coherent backup strategy. The media modules 310 and 320 are communicatively coupled to library media 312 and 322, for which the media modules 310 and 320 are responsible for operating and maintaining, respectively. Thus, a modular, interconnected backup system is shown.

Figure 4:
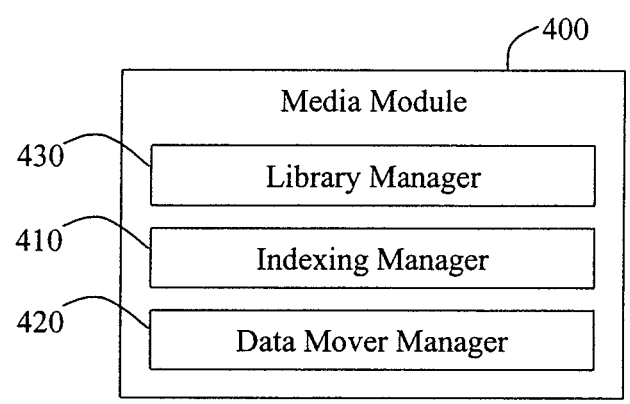
FIG. 4 is a block diagram of an exemplary embodiment of the media module of FIG. 3 where the lower level functional units of FIG. 2 are implemented in a single software agent.

FIG. 4 is a block diagram of an exemplary embodiment of the media module of FIG. 1 where the lower level functional units of FIG. 2 are implemented in a single software agent. A media module 400 can comprise an indexing manager 410, a data manager 420, and a library manager 430, all of which are described above with respect to FIG. 2. It should be noted that the managers can be independent processes, such as sub-agents, or can exist as modules under one or more independent agents.

Figure 5:
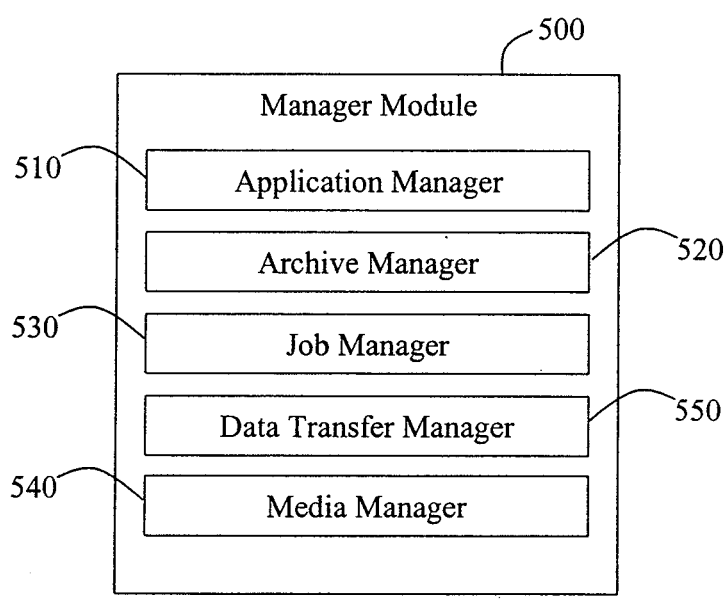
FIG. 5 is a block diagram of an embodiment of the manager component of FIG. 5 where the lower level functional units of FIG. 2 are implemented in a single software agent.

FIG. 5 is a block diagram of an embodiment of the manager module of FIG. 5 where the lower level functional units of FIG. 1 are implemented in a single software agent. A manager module 500 may contain an application manager 510, an archive manager 520, a job manager 530, a media manager 540, and a data transfer manager 550. It should be noted that the managers can be independent processes, such as sub-agents, or can exist as modules under one or more independent agents.

Figure 6:
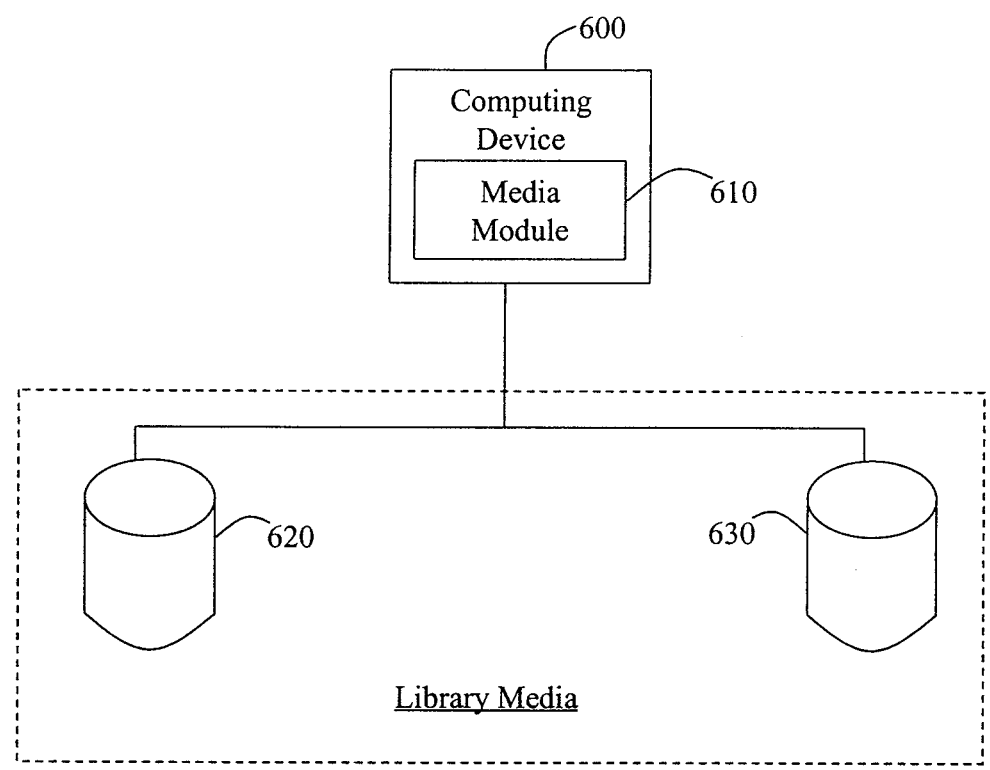
FIG. 6 is a functional block diagram of an exemplary embodiment of the interaction between the media agent and the storage device of FIG. 1.

FIG. 6 is a functional block diagram of an exemplary embodiment of the interaction between the media module and the library media of FIG. 1. A media module 610 runs on a computing device 600. The media module 610 manages and directs two different library media 620 and 630. It should be noted that the media module 610 could direct and manage various types of library media using device drivers. It should also be noted that any number of library media may be managed or controlled by the media module 610. As such, the library media 620 and 630 may be, among others, single platter magnetic disks, multi-platter magnetic disks, RAID media, optical type media, and longterm magnetic media such as tape drives. The media module 610 may control one library with associated media, multiple instances of the same type of library with associated media, or multiple instances of different types of libraries and their associated media.

The library media may also be jukebox type media employing magneto-optical platters, or cartridge tapes. In this case, the media module would contain software for operating the robotic jukebox devices, as well as for operating the physical reading and writing of the information to the media. The software for such communication and/or manipulation may reside under an application programming interface (API) module, where the device drivers for the specific library media may be interchangeably interfaced to the media module 610.

Figure 7:
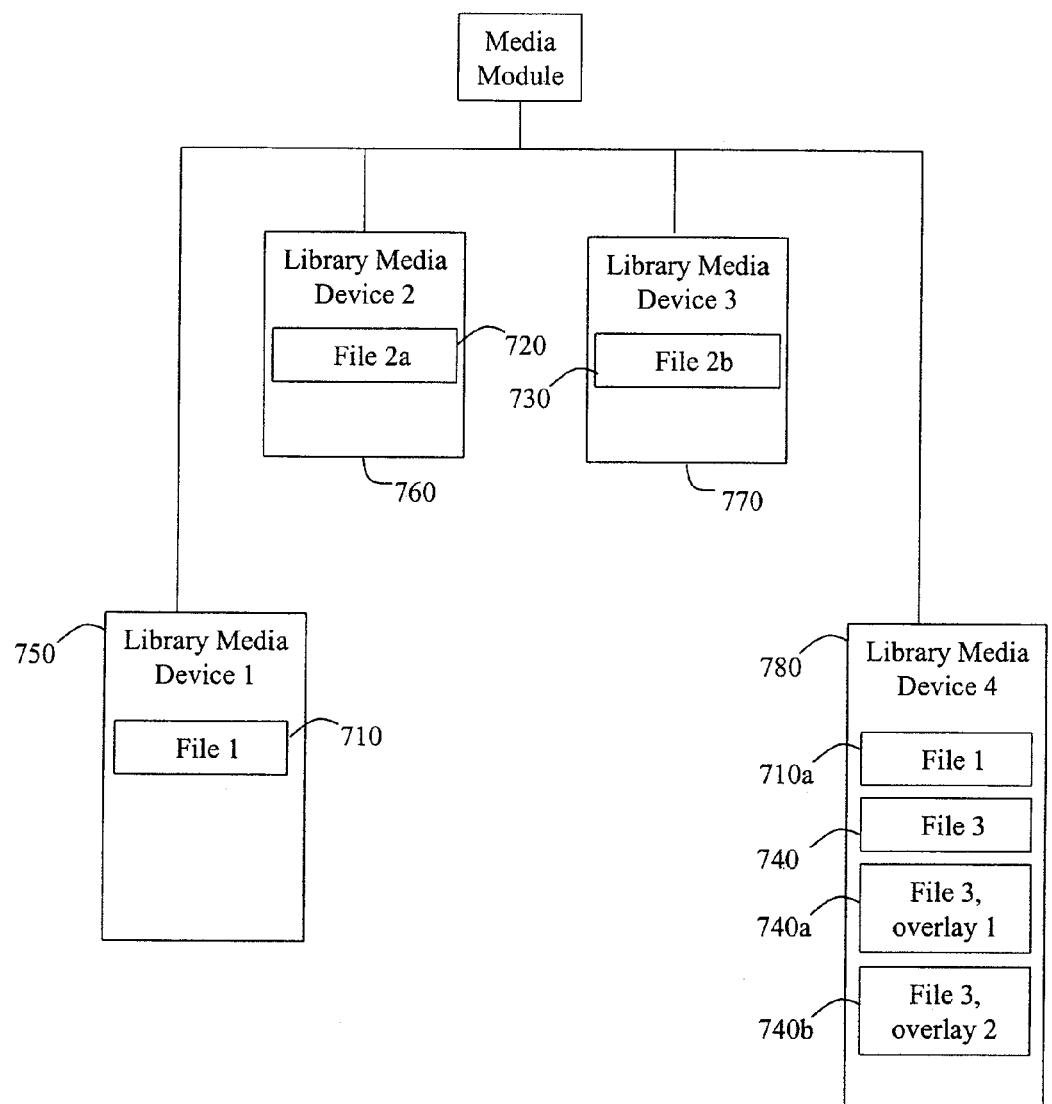
FIG. 7 is a schematic block diagram exemplary embodiment of a media component of FIG. 1 utilizing a storage scheme of several types of storage media and the ability to store the information across the media and as separate copies across the media.

FIG. 7 is a schematic block diagram exemplary embodiment of a media module of FIG. 1 utilizing a storage scheme of several types of storage media and the ability to store the information across the media and as separate copies across the media. A media module 700 is responsible for the physical backup of files and/or data across several library media which it controls. For example, the media module 700 manages, controls, and maintains the library media devices 750, 760, 770, and 780. A file and/or data may be processed by the media module 700 as different copies of the same file and/or data spanning the various library media devices that it controls. Further, each archived copy of the data and/or file may itself span the individual library media devices 750, 760, 770, and 780.

A file 710 is archived on the storage device 750. A separate file spans the storage devices as a file portion 720 and a file portion 730 in the storage devices 760 and 770. A copy of the file 710, 710a, is maintained separately in the storage device 780. Additionally, the archived files may be stored on a differential block basis. For example, the file 740 is stored on the library media device 780. However, at a later time, an incremental backup has determined that the file 740 has been altered, but only in one sector. The backup and retrieval system could operate in a fashion such that the backup of the altered version of the file 740 comprises only those sections of the file that have changed. Thus, the blocks 740a and 740b represent the portions of the file 740 that have changed. The file 740, when overlaid with the blocks 740a and 740b, stands for the current altered version of the file 740.

Figure 8:
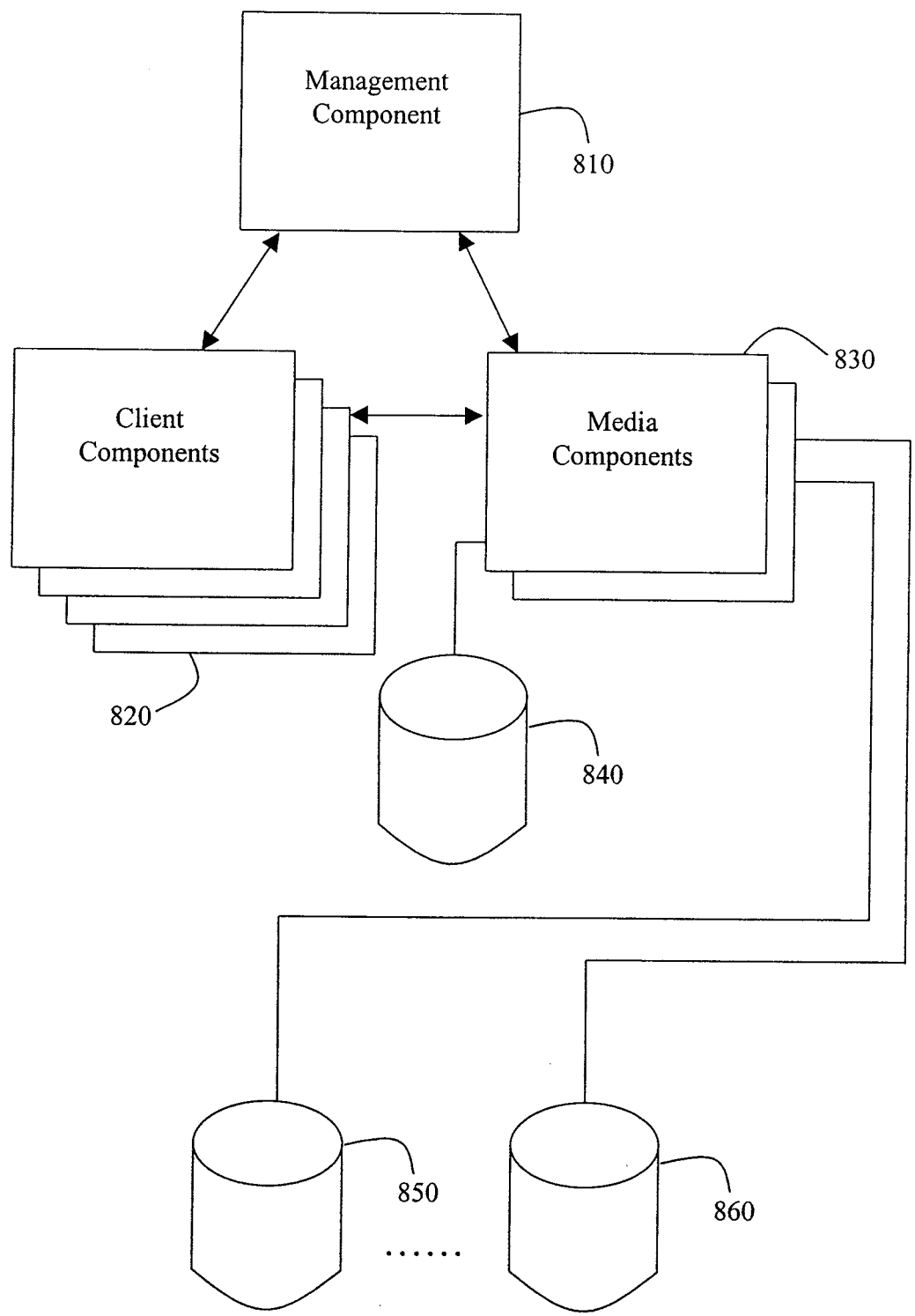
FIG. 8 is a schematic block diagram of an embodiment of the modular backup system according to the invention.

FIG. 8 is a schematic block diagram of an embodiment of the modular backup system according to the invention. Typically, a modular backup system 800 comprises several software components, including a management component 810 communicatively coupled to least one client component 820, and at least on media component 830. There may be more than one client component 820, as well as more than one media component 830. The client components 820 may be communicatively coupled to the one or more media components 830.

The three software components 810, 820, and 830 are software agents. These software agents may reside on several different computing devices. The software agents can comprise sub-agents, as described above in relation to FIGS. 2-4, or contain their functionality as included modules. As such, the components of the modular storage and retrieval system 800 of a management component 810, the client component 820, and the media component 830 are typically software programs running on the respective computing devices.

A management component 810 is the software agent that can control the actions of the media components 830 with which the management component 810 is associated. The management component 810 tracks and operates the global archival parameters of the computing devices for which it is responsible. The management component can initiate new jobs, keep track of all running and waiting jobs, control allocation of media drives, and keep track of the status of the client components 820 and the media components 830 with which it is associated.

The management component 810 also keeps track of other important parameters regarding the archival functionality of the computing devices with which it is associated. For example, the management component 810 can keep track of backup schedules for each computing device with which it is associated, track the level of backup (such as incremental differential, or full back up) for the associated computing devices, and determine and resolve conflicts between backups or other archival requests competing for the same temporal and/or physical resources of the backup system.

The management component 810 may also maintain the archives through various policies. The policies may include drive-cleaning policies, index pruning policies, aging policies, and library media volume maintenance. For example, the management component 810 may implement a policy that initially archives files and/or data on a relatively fast media. Upon another archival cycle, the management component 810 may relocate the first set of archived files and/or data to another slower type media, due to the presence of another set of a newly archived data and/or files. Alternatively, for example, older differential or incremental backups maybe completely deleted from an archive upon the completion and verification of a newer full backup. One skilled in the art should recognize that since the management component 810 is a software agent, these policies might be fully programmable and automatically adaptable to changing conditions in the computing devices serviced by the backup and retrieval system, as well as traffic on a network or networks linking them. The management component 810 may contain the ability to implement one or more of these policies in a fully adaptable archival management scheme.

The policies may include prioritizing the archived files and/or data to various library media 840, 850 and 860 according to various criteria. These criteria may include priorities of files as determined by a network or machine file system, as determined by a network or machine system administrator, or as determined by an application running on a network machine, for example. One skilled in the art should recognize that these policies are also fully adaptable in an archival management scheme.

The management component 810 is communicatively coupled to at least one media component 830. A media component 830 is a software agent that controls the library media 840, 850 and 860 that house the archived data. The management component 810 can direct the particular media component 830 controlling a particular library media 840, 850 and 860 to perform a particular archival request, such as a backup, or a retrieval.

In a backup function, the management component 810 could format or direct the particular files and/or data to the media component 830 for storage. The media component 830 would receive the files and/or data, and direct them to a particular library media 840, 850 and 860 that the media component 830 controls. Upon successful archival of the files and/or data to the library media 840, 850 and 860, the media component 830 would then create an index detailing the location of the archived files and/or data on the library media 840, 850 and 860. This index could include the actual media library device used and the parameters of that media library device where the particular file and/or data is located within the particular media library device. For example, if the media library device. For example, if the media library device was a magnetic disk, the index created might contain the block, track, and sector numbers of the magnetic disk where the particular file and/or data is located on the magnetic disk. One skilled in the art should recognize that this index need not be restricted to a physical device, but may be extended to any addressable type device, including virtual devices. Further, one skilled in the art will recognize that each library media device could contain its own unique mode of operation and known unique mode of indexing any data or file stored on it.

A client component 820 directs and manages the archival functions of a particular computing device falling within the aegis of the backup system. A particular client component 820 directs and tracks the archival parameters for a particular computing device. Additionally, a particular client component 820 may also serve to interact with the management component 810 for unscheduled backup activities. A user may interface with the backup system through a graphical user interface in any particular client component 820. The particular client component 820 can set backup priorities of files and/or data contained on the particular computing device, and request rescheduling of archival actions for the computing device for which it is responsible.

For example, a particular client component 820 can set the level of backup for a particular machine. It may also set a filter of the types of data and/or files to include or exclude from any type of backup. A particular client component 820 manages the timing and the level of backup, manages the files and/or data to be backed up, and can be used to request specific unscheduled archival actions from the management component 810.

In an exemplary embodiment, the backup system 800 operates as a cohesive unit. Either a particular client component 820 responsible for a particular computing device or a management component 810 can initiate a backup of the particular computing device.

In the first case, the particular client component 820, either automatically through interaction with the operating system of the particular computing device or through interaction with application software running on the particular computing device initiates a backup archival request. The backup archival request may contain either a list of particular files and/or data to be archived, or it may contain the criteria by which the particular file and/or data may be selected to be archived. The backup archival request may contain the particular files and/or data to be archived.

If the backup archival request by the particular client component 820 contains the particular files and/or data from the particular computing device in the archival request, the management component 810 then determines from the system-wide parameters it manages which library media 840, 850 and 860 should archive the particular files and/or data to be archived. This determination may also involve priority of the information.

The management component 810 then forwards the information to be archived to the particular media component 830 responsible for the library media 840, 850 and 860 that will be used in the archival action. The particular media component 830 responsible for the library media 840, 850 and 860 receives the information to be archived, and proceeds to direct the particular library media 840, 850 and 860 to archive the information as requested. The particular media component 830 records an index entry of the archived information. This index entry can contain an indication of the information archived, the particular library media 840, 850 and 860 which physically archives the information, and the address on the particular library media 840, 850 and 860 at which the information may be retrieved.

Upon a successful archival of the information on the library media 840, 850 and 860, the particular media component 830 proceeds to acknowledge that successful completion of the archival action by forwarding to the management component 810 information on the successful archival action. This information includes the indexing information by which the management component 810 may track and manage the archived information.

If the back up archival request by the particular client component 820 contains a list or indication of particular files and/or data to be archived, the management component 810 may acknowledge the request by requesting transmittal of the particular files and/or data by the particular client component 820. Once the management component 810 receives the particular files and/or data, the management component 810 determines the proper library media 840, 850 and 860 on which to archive the information. The management component 810 then requests that the particular media component 830 responsible for the library media 840, 850 and 860 archive the data. The management component 810 forwards the information about the data to be archived to the selected media component 830. The selected media component 830 then coordinates the physical archival action with the library media 840, 850 and 860. Upon a successful archival of the information on the library media 840, 850 and 860, the particular media component 830 proceeds to acknowledge that successful completion of the archival action by forwarding to the management component 810 information on the successful archival action. This information includes the indexing information by which the management component 810 may track and manage the archived information.

In another embodiment, the management component 810 would determine a specific library media 840, 850 and 860 on which to archive the information. It could then pass the media component 830 responsible for that library media 840, 850 and 860 other information by which the specific media manager 830 and the requesting client component 820 could establish communication between themselves. The data and/or files could then be passed between the specific media component 830 and the requesting client component 820.

Alternatively, the management component 810 may initiate the archival action based on the system-wide parameters as controlled by management component 810. For example, the management component 810 may determine that a particular computing device is due for a backup. This backup may be one for an incremental backup, a differential backup, or a full backup. The management component 810 would then request that the particular client component 820 responsible for interacting with and managing the particular computing device make a determination of the files and/or data that are due for the particular backup requested. The particular client component 820 responsible for managing the particular computing device would then act to collect the files and/or data to be archived on the particular computing device.

In one embodiment, the particular client component 820 would forward to the management component 810 a description of the information to be archived from the computing device. This description may also contain an indication of the priority for the retrieval of the information provided. Thus, the management component 810 would then determine the proper library media 840, 850 and 860 on which to archive the information from the computing device. Upon receipt of this information and the determination of the proper library media 840, 850 and 860 to be used in the archival action for each file and/or data, the management component 810 may request the actual data and/or files from the particular client component 820 to be archived. The particular client component 820 may then forward the information to be archived to the particular media components 830 responsible for the actual physical archival action.

In another embodiment, the particular client component 820 would forward to the management component 810 both the files and/or data to be archived along with the corresponding information for each. In this embodiment, any network traffic between the management component 810 in the particular client component 820 would be reduced.

In yet another embodiment, the particular client component 820 would forward the information concerning the data and/or files to be archived to the management component 810. The management component 810 would then determine the proper library media 840, 850 and 860 or medium on which to archive the data and/or files. The management component 810 may then initiate the archival action by forwarding a request to the particular media components 830 selected to handle the physical archival actions. This request could contain the pertinent file information. The particular media components 830 may then request directly from the particular client component the files and/or data to be archived. Thus, in this case, the management component 810 indirectly manages the actual archival process. It indirectly manages the archival process by providing the files and/or data to be archived to the particular media components 830 by providing the information on the files and/or data. Additionally it provides the means to instigate communication directly between particular media components 830 and the particular client component 820.

In any case, the particular media components 830 manage and direct the physical archiving process. The particular media components 830 create an index entry for each file and/or data unit archived. Each particular media component 830 forwards batches of metadata back to the management component 810. This metadata contains that information by which the management component 810 may track and manage the archived data. The "metadata" may also contain information on the origination of the data and/or files, permissions associated with the data and/or files, and other administrative information.

The management component 810 tracks the archival process through the metadata passed back from the particular media components 830. Thus, for any given archived file and/or data, the management component 810 can precisely track where the information is archived, even when portions of the archived data span several library media 840, 850 and 860. Given the information as passed from the particular media components 830 to the management component 810 regarding the archived files and/or data, the management component 810 can track all versions of the archived information, including all full backups, all differential backups, sector based backups of large data fields or files, and all portions of the archived file and/or data that may reside across several media, as well as operating system information on the data and/or files as well as other information deemed important by an administrator.

Turning now to the restoration or retrieval process, a restoration or retrieval may be initiated either by the management component 810 or by the particular client component 820. Upon the initiation of a restoration request by the particular client component 820, the management component 810 uses the information created by the indexing function of the media component 830 to determine where to locate the file and/or data, or the portions spanning several library media making up the file and/or data. Upon determining the correct location of the requested file and/or data, or the portions making up that file and/or data, the management component 810 requests the particular media components 830 to find and retrieve the requested file and/or data, or portions making up the requested file and/or data.

In one embodiment, the particular media component or components 830 relay the requested information back to the management component 810. If the requested information spans portions, the management component 810 may assemble the whole of the requested file and/or data for relaying back to the requesting client component 820. Upon receipt of the requested information, the requesting client component 820 makes the retrieved information available to the particular computing device which it is responsible for.

In another embodiment, the management component 810 also relays to the particular media components 830 information on the requested file and/or data, or portions of the requested file and/or data. In addition, the management component 810 makes available to the particular media components 830 the location of the requesting client component 820. Thus, when the particular media components 830 retrieve the information, the particular media components 830 may forward the retrieved information to the requesting client component 820 directly. The requesting client component 820 then assembles the retrieved information for presentment to the particular computing device for which it is responsible.

The use of the particular components is not restricted to any particular machine. The components may reside on the same computing devices, on different computing devices, or may be combined in any different combination of computing devices.

Figure 9:
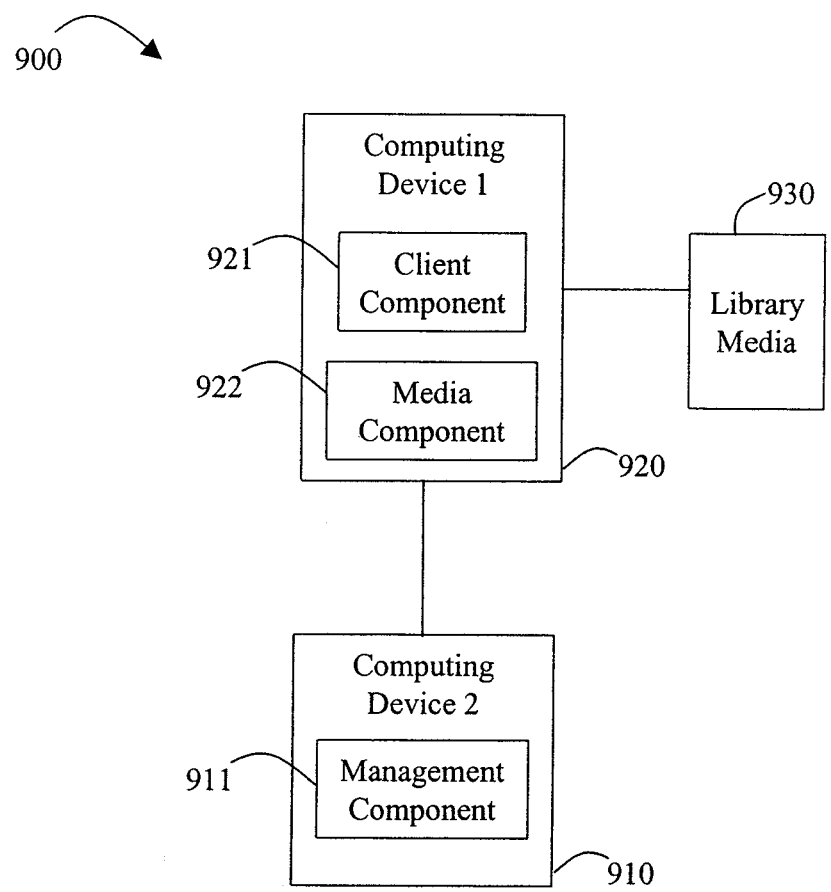
FIG. 9 is a schematic block representation of an embodiment of the backup system of FIG. 8 with a client component and a media component combined on a single computing device and managed by a management component on another computing device.

FIG. 9 is a schematic block representation of an embodiment of the backup system of FIG. 8 with a client component and a media component combined on a single computing device and managed by a management component on another computing device. A backup and retrieval system 900 spans two computing devices 910 and 920. The computing device 910 contains a management component 911. Another computing device 920 contains a client component 921 and a media component 922. The library media 930 is coupled to the computing device 920. The media component 922 is responsible for archival actions to and from the library media 930. The client component 921 is responsible for the management of archival actions on the computing device 920. The management component 911 is responsible for system-wide maintenance and management of archival functions.

Figure 10:
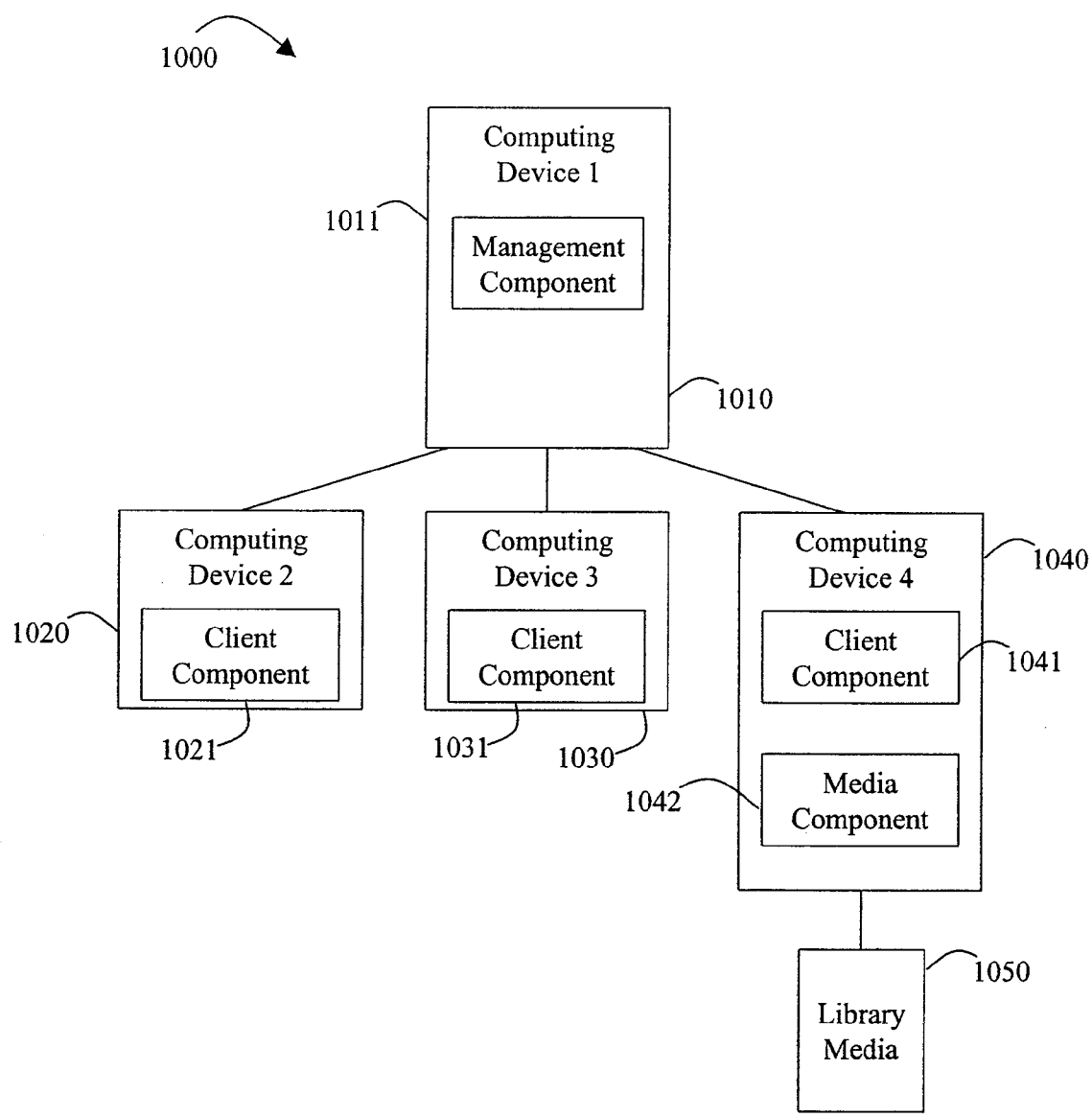
FIG. 10 is a schematic block representation of an embodiment of the backup and retrieval system of FIG. 8 having four computing devices.

FIG. 10 is a schematic block representation of an embodiment of the backup and retrieval system of FIG. 8 having four computing devices. A backup and retrieval system 1000 spans four computing devices. A computing device 1010 comprises a management component 1011. The computing device 1010 communicates with a computing device 1020 comprising a client component 1021. The computing device 1010 also communicates with a computing device 1030. The computing device 1030 also comprises a client component 1031. The computing device 1010 communicates with another computing device 1040. The computing device 1040 comprises a client component 1041 and a media component 1042. The media component 1042 directs and manages archival requests to an archival library media 1050.

Each of the client components 1021, 1031, and 1041 directs and manages the archival functions of the computing devices 1020, 1030, and 1040, respectively. The management component 1011 directs and manages the archival activities of the computing devices 1020, 1030, and 1040.

All archival requests from the computing devices, from the client components on the computing devices, or from the management component 1011 are directed to the media component 1042. The media component 1042 processes and manages all archival requests for the three computing devices such as backups and retrievals. Backups and retrievals to and from the computing devices 1020 and 1030 involve requests from the client component on the respective computing devices to the management component 1011, and possibly transfers of data between the management component 1011 and the particular client components residing on these machines.

Figure 11:
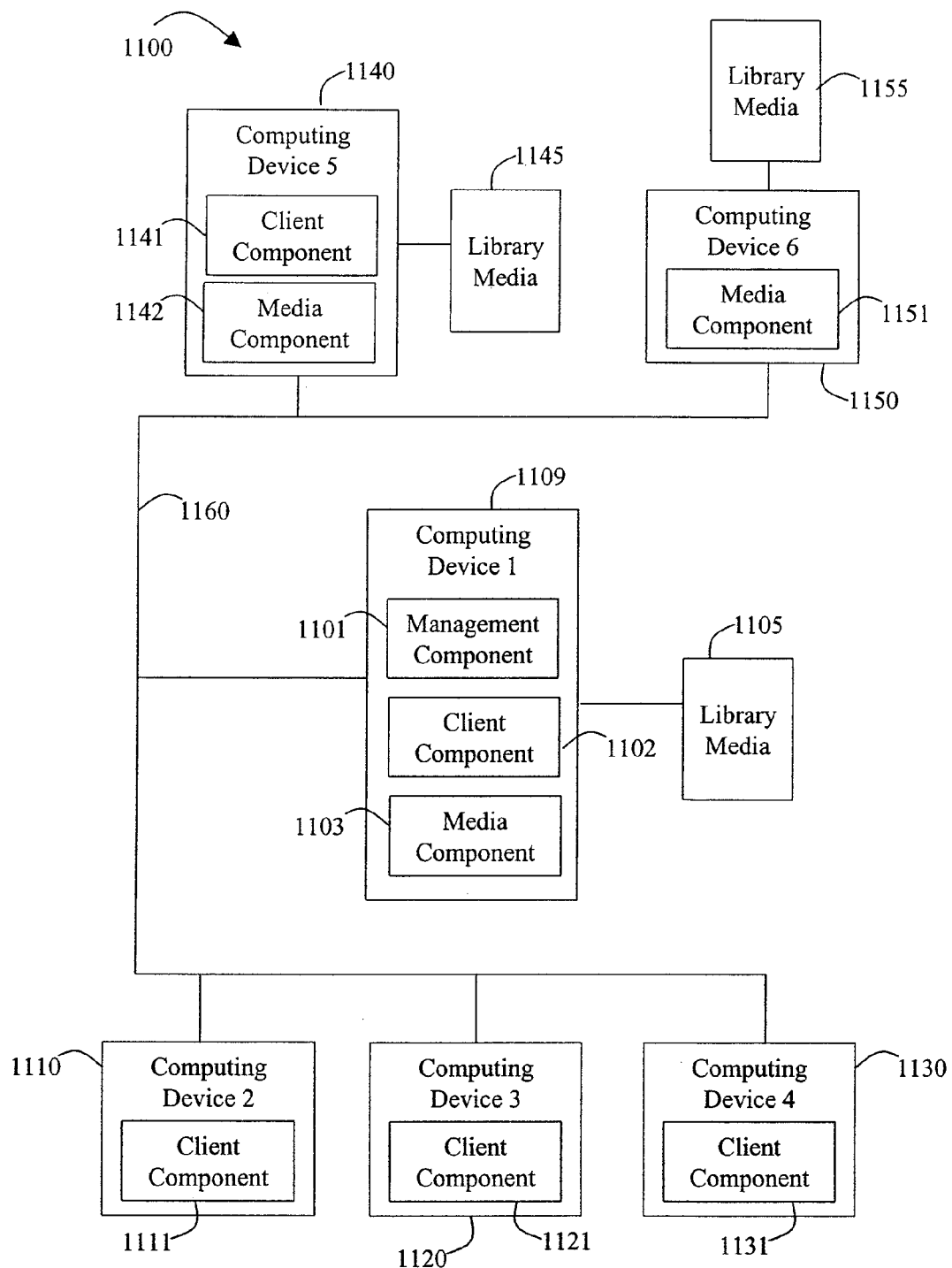
FIG. 11 is a functional block diagram of an embodiment of the backup and retrieval system of FIG. 8 comprising a hybrid configuration of the software agents.

FIG. 11 is a functional block diagram of an embodiment of the backup and retrieval system of FIG. 8 comprising a hybrid configuration of the software agents. A backup and retrieval system 1100 spans six different computing devices. A computing device 1109 contains a management component 1101, a client component 1102, and a media component 1103. A library media 1105 communicates with the computing device 1109. The media component 1103 is responsible for archival requests and management functions regarding the library media 1105.

Another computing device 1110 contains a client component 1111. Other computing devices 1120 and 1130 contain associated client components 1121 and 1131. The client components 1111, 1121, and 1131 communicate with the management component 1101. The client components 1111, 1121, and 1131 can also communicate with the media component 1103.

A computing device 1140 contains a client component of 1141 and a media component 1142. Another library media 1145 is managed and controlled by the media component 1142 operating on the computing device 1140.

A computing device 1150 contains solely a media component 1151. Attached to the computing device 1150 is another library media 1155. Archival requests to and from the library media 1155 are managed by the media component 1151. As shown, the computing device 1150 can be a dedicated library media controller.

Any of the client components 1102, 1111, 1121, 1131, and 1141 may request archival requests such as backups and retrievals. The management component 1101 can direct any backup requests by any client component to any of the attached library media 1105, 1145, and 1155. The management component 1101 would direct the backup requests to the associated media components responsible for management and control of the particular library media. In this example, the media components 1103, 1142, and 1151 would field and process the requests for the library media 1105, 1145, and 1155, respectively.

The management component 1101 may monitor the usage of all the library media and direct backup requests to an appropriate library media as dictated by the usage of the particular media. The computing device may also monitor the traffic on a network 1160 connecting the various computing devices. Based on network traffic flow, the management component 1101 may appropriately direct backups to less heavily trafficked computing devices on the network 1160. Thus, the management component 1101 may adaptably react to changing characteristics in a network environment. Thus, the backup for any of the computing devices 1109, 1110, 1120, 1130, or 1140, may end up on any library media in communication with a media component. Archival requests to and from the computing devices 1110, 1120, and 1130, such as backup and retrieval requests, may be implemented through the media component 1103.

Figure 12:
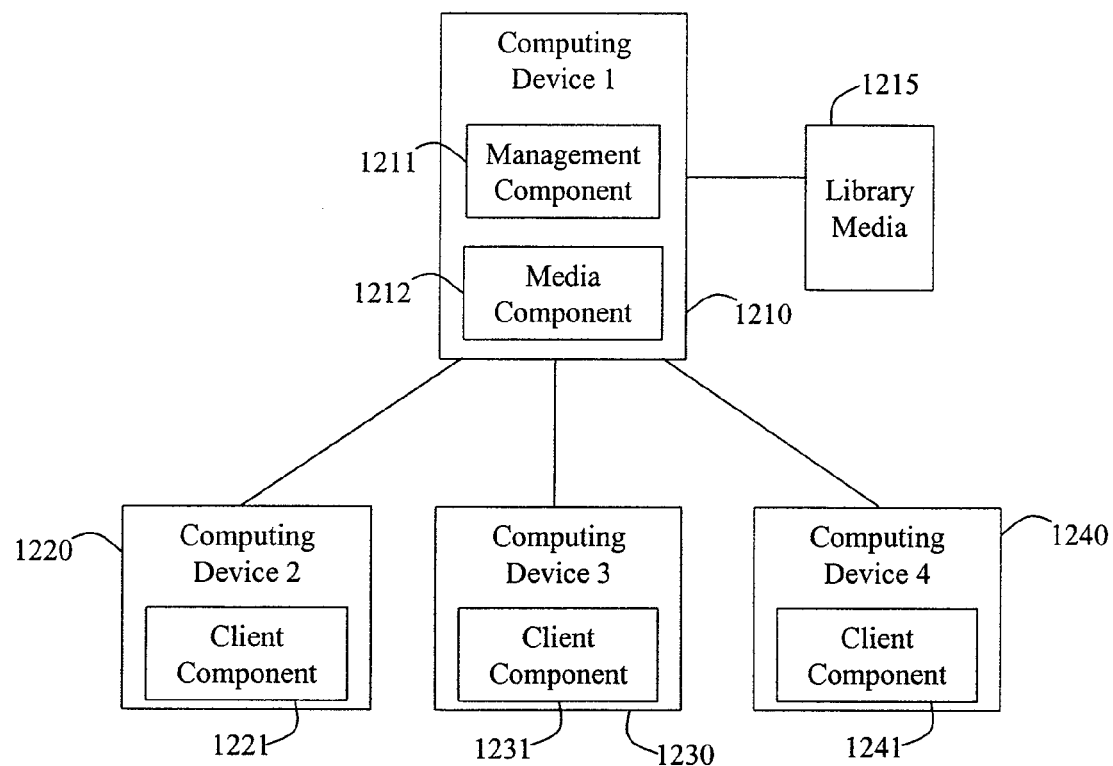
FIG. 12 is a functional block diagram of the modular backup system of FIG. 8 where a computing device contains a management component and a media component for the archival of information from the attached computing devices.

FIG. 12 is a functional block diagram of the modular backup system of FIG. 8 where a computing device contains a management component and a media component for the archival of information from the attached computing devices. A computing device 1210 contains a management component 1211 and a media component of 1212. The computing device 1210 communicates with a library media 1215. The media component 1212 manages and directs archival functions on the library media 1215.

A computing device 1220 containing a client component 1221 communicates with the computing device 1210. Another computing device 1230 containing a client component 1231 communicates with the computing device 1210. Yet another computing device 1240 containing a client component 1241 communicates with the computing device 1210. The management component 1211 manages the archival parameters for the attached computing devices 1220, 1230, and 1240. The computing device 1210 serves as a combination of a dedicated data storage device and a network archival manager.

In view of the above detailed description of the present invention and associated drawings, other modifications and variations will now become apparent to those skilled in the art. It should also be apparent that such other modifications and variations may be effected without departing from the spirit and scope of the present invention as set forth in this specification.

What is claimed is:

1. A modular system for managing data storage operations in a network environment, the system comprising:
    a plurality of storage devices, wherein a first storage device is a magnetic disk and a second storage device is a tape drive;
    a plurality of first modules, each first module operating on a particular one of a plurality of first computing devices and configured to identify data from the particular first computing device to be associated with one or more storage operations, wherein the data comprises files that are organized into data bundles;
    a plurality of second modules operating on a plurality of second computing devices and communicatively coupled to the plurality of first modules and to the plurality of storage devices via a network, the plurality of second modules being configured to receive the identified data from the plurality of first modules and to direct a physical transfer of the identified data to the plurality of storage devices; and
    a manager module communicatively coupled to the plurality of first and second modules, the manager module being configured to initiate a first storage operation based on a schedule associated with one or more storage policies, wherein the manager module identifies at least one of the second modules to perform the storage of at least a first data bundle, wherein the manager module is further configured to dynamically alter the schedule based on usage of the network and to select at least one first module from the plurality of first modules and at least one second module from the plurality of second modules to perform the first storage operation, said selection of the at least one second module being based on at least loads of the plurality of second modules, wherein the at least one second module is configured to store the first data bundle by spanning the files in the first data bundle on at least the first storage device comprising the magnetic disk and the second storage device comprising the tape drive, wherein the at least one second module creates and stores a first index, the first index is stored in association with the at least one second module, the first index maintaining at least a physical location of the files in the first data bundle, wherein the physical location in the first index details the physical addresses of the files spanning the first storage device comprising the magnetic disk, and the second storage device comprising the tape drive, wherein the at least one second module is further configured to create and forward a second index to the manager module, wherein the second index is stored in association with the manager module, and comprises information that associates the first data bundle with the at least one second module, while retaining the physical addresses of the files in the first index such that the second index associated with the manager module comprises less information regarding the physical location of the files than the first index associated with the at least one second module, wherein when retrieval of at least a portion of the first data bundle is requested from a client, the manager module uses the second index stored in association therewith, to identify that the at least one second module is associated with the first data bundle, and forwards the request to the at least one second module, the manager module further configured to forward to the at least one second module, communications information by which the at least one second module can establish a communications link with the client, the at least one second module configured to use the physical addresses in the second index stored in association with the second module, to retrieve the requested portion of first data bundle spanning the first storage device comprising the magnetic disk and the second storage device comprising the tape drive, and the at least one second module further configured to provide the requested portion of the first data bundle to the client via the communications link indentified by the communications information provided by the manager module.

2. The modular system of claim 1, wherein the at least one first module is configured to filter types of data from the particular first computing device to include in the first storage operation.

3. The modular system of claim 1, wherein each of the plurality of first modules is application specific.

4. The modular system of claim 1, wherein the manager module is configured to initiate the first storage operation in response to a request from the at least one first module.

5. The modular system of claim 1, wherein the manager module is configured to initiate the first storage operation based on an aging policy.

6. The modular system of claim 1, wherein the manager module is configured to initiate the first storage operation based on a network load.

7. The modular system of claim 1, wherein the manager module is further configured to track configuration parameters of one or more applications running on the plurality of first computing devices.

8. The modular system of claim 1, wherein the at least one second module is further configured to store a first portion of the data associated with the first storage operation to a first storage device and a second portion of the data associated with the first storage operation to a second storage device.

9. The modular system of claim 1, wherein the at least one first module is further configured to manage a timing of the first storage operation.

10. The modular system of claim 1, wherein the at least one first module is further configured to prioritize the data to be stored according to the first storage operation.

11. A method for performing storage operations in a network environment, the method comprising:
receiving a request to perform a storage operation;
selecting with a manager module, a first media module from the plurality of media modules to perform the storage operation based on a schedule associated with one or more storage policies, wherein the storage operation stores files that are organized into data bundles;
selecting a first client module from a plurality of client modules to obtain from a first computing device data associated with the storage operation;
instructing the first media module to perform the storage of a first data bundle, wherein the first media module spans the files in the first data bundle on at least the first storage device comprising the magnetic disk, and the second storage device comprising the tape drive,
wherein the first media module creates and stores a first index recording a physical location of the files associated with the first data bundle, the first index stored in association with the first media module, wherein the physical location of the files in the first index details the physical addresses of the files spanning the at least the first storage device comprising the magnetic disk and the second storage device comprising the tape drive,
wherein the first media module further creates and forwards a second index to the manager module, the second index is stored in association with the manager module, the second index comprises metadata that associates the first data bundle with the first media module, while retaining the physical address of the files in the first index such that the second index associated with the manager module comprises less information regarding the physical location of the files than the first index associated with the first media module,
wherein when retrieval of at least a portion of the first data bundle is requested from a client, the manager module uses the first index to identify that the first media module is associated with the first data bundle, and forwards the request to the first media module,
forwarding with the manager module, communications information by which the first media module can establish a communications link with the client,
using the first media module to access the physical addresses in the second index to retrieve the requested portion of first data bundle spanning the at least two storage devices, and
providing with the first media module, the requested portion of the first data bundle to the client via the communications link indentified by the communications information provided by the manager module.

12. The method of claim 11, further comprising instructing a second media module of the plurality of media modules to retrieve the data from the first storage device.

13. The method of claim 12, wherein said retrieving comprises relocating the stored data from the first storage device to a second storage device of the plurality of storage devices, wherein the second storage device comprises a slower medium than the first storage device.

14. The method of claim 11, wherein the metadata further comprises information on at least one of origination information of the stored data and permissions associated with the stored data.

15. The method of claim 11, wherein the request to perform the storage operation is received from the first client module.

16. The method of claim 11, wherein the storage operation comprises an incremental backup operation.

17. The method of claim 16, wherein said selecting the first client module comprises sending to the first client module criteria for determining the data to include in the incremental backup operation.

18. The method of claim 11, wherein the request to perform the storage operation is based on a backup schedule.

19. The method of claim 11, wherein said instructing the first media module further comprises instructing the first media module to perform the physical transfer of a first portion of the data to the first storage device of the plurality of storage devices and to perform the physical transfer of a second portion of the data to a second storage device of the plurality of storage devices.

* * * * *

UNITED STATES PATENT AND TRADEMARK OFFICE
CERTIFICATE OF CORRECTION

| | | |
|---|---|---|
| PATENT NO. | : 8,433,679 B2 | Page 1 of 1 |
| APPLICATION NO. | : 12/135584 | |
| DATED | : April 30, 2013 | |
| INVENTOR(S) | : Crescenti et al. | |

It is certified that error appears in the above-identified patent and that said Letters Patent is hereby corrected as shown below:

On Title Page 4, column 2 line 35, item [56] Under Other Publications, delete "21/12/200." and insert --21/12/2000.--.

In the Specification

Column 4 line 21, delete "and or" and insert --and/or--.

Column 4 line 57, delete "medial" and insert --media--.

Column 5 line 66, delete "Sine" and insert --Since--.

Column 7 line 66, delete "on" and insert --one--.

In the Claims

Column 15 line 53, Claim 1, delete "indentified" and insert --identified--.

Column 17 line 1, Claim 11, delete "indentified" and insert --identified--.

Signed and Sealed this
Thirteenth Day of May, 2014

Michelle K. Lee
*Deputy Director of the United States Patent and Trademark Office*